United States Patent [19]

Urban

[11] Patent Number: 4,715,701

[45] Date of Patent: Dec. 29, 1987

[54] MIRROR AND BRACKET ASSEMBLY

[76] Inventor: Milfred W. Urban, 1337 N. Meridian, Wichita, Kans. 67203

[21] Appl. No.: 888,413

[22] Filed: Jul. 23, 1986

[51] Int. Cl.⁴ ............................ G02B 5/10; G02B 7/18
[52] U.S. Cl. ..................................... 350/625; 350/631; 248/467; 248/475.1; 248/480; 248/549
[58] Field of Search ............... 350/625, 627, 631, 632, 350/639; 248/467, 475.1, 480, 549, 900

[56] References Cited

U.S. PATENT DOCUMENTS 3,563,638 2/1971 Panozzo ............................. 350/625
4,105,295 8/1978 Skilliter ............................ 350/631
4,549,786 10/1985 Albers et al. ...................... 350/625

FOREIGN PATENT DOCUMENTS 1133005 11/1968 United Kingdom ............... 350/625

Primary Examiner—Jon W. Henry
Attorney, Agent, or Firm—John W. Carpenter

[57] ABSTRACT

A mirror and bracket assembly wherein the mirror housing has a flat mirror and a convex mirror. The mirrors are secured to support posts within the mirror housing such that if the mirror housing is dropped or jarred the flat mirror and the convex mirror would not become misaligned.

13 Claims, 25 Drawing Figures

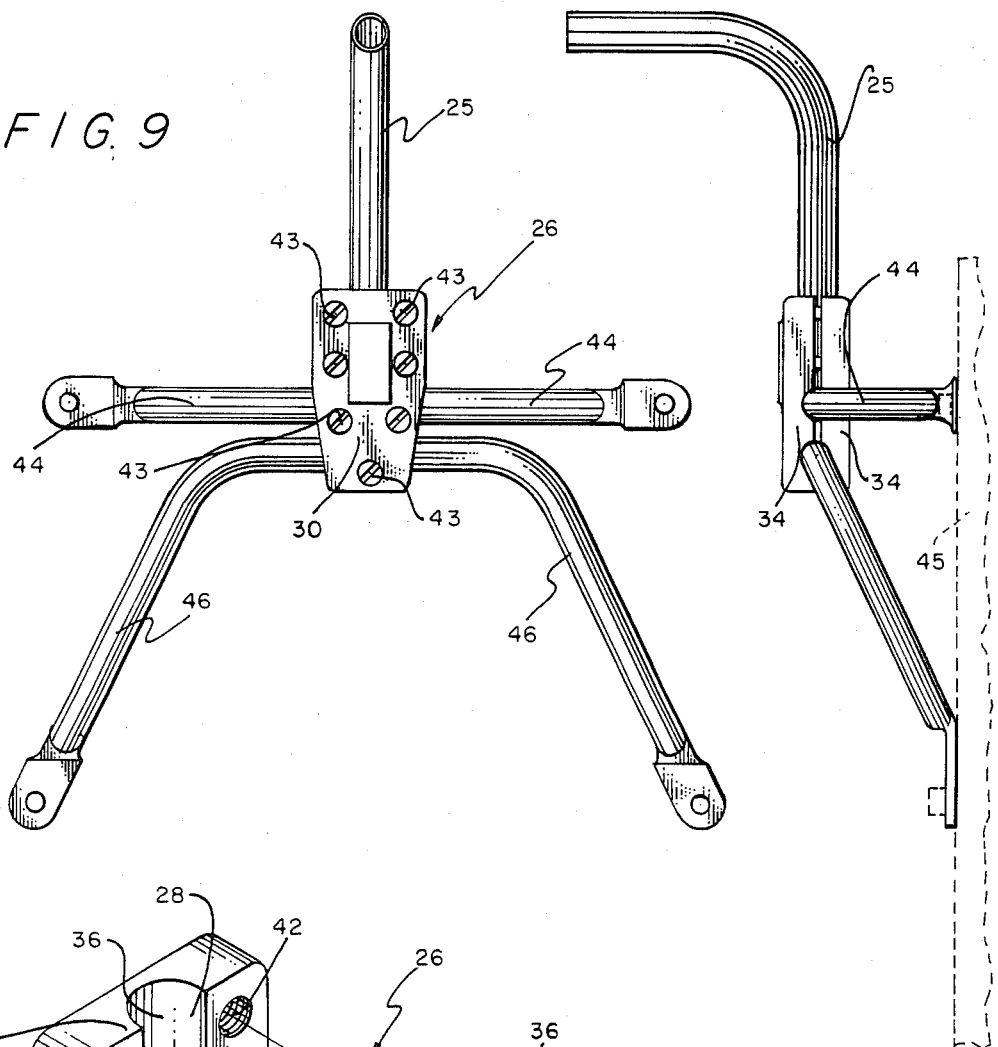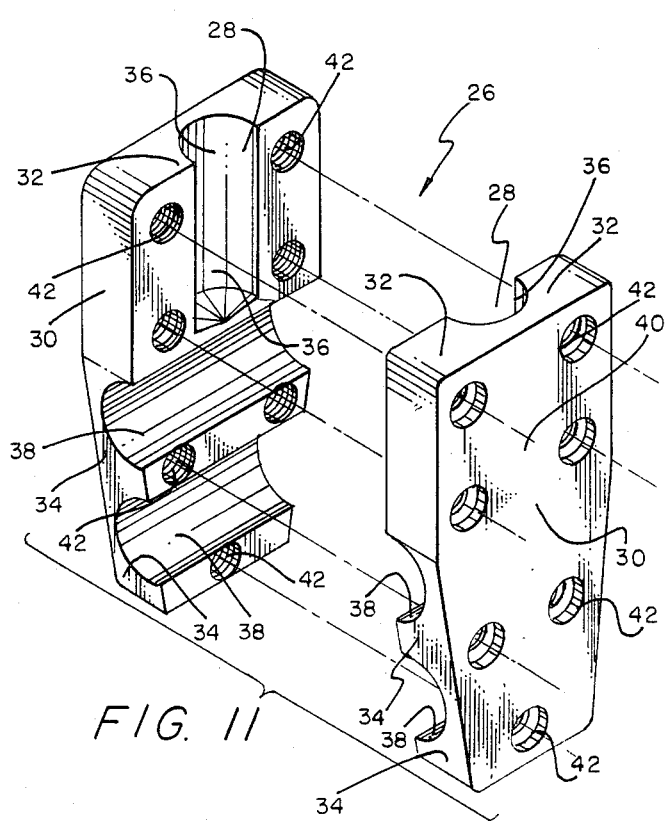

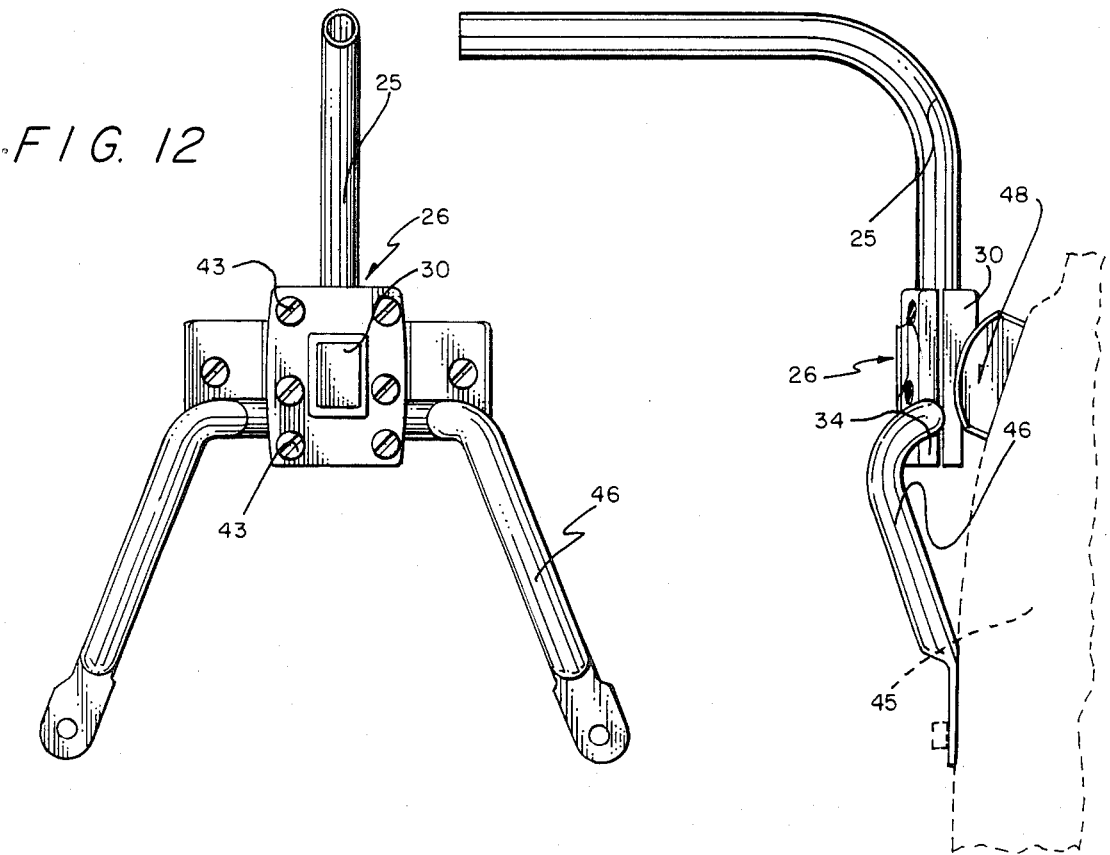
FIG. 12
FIG. 13
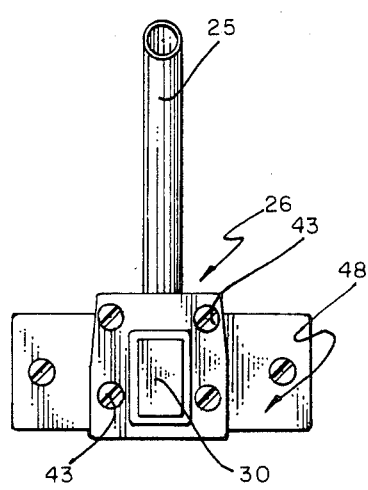
FIG. 14
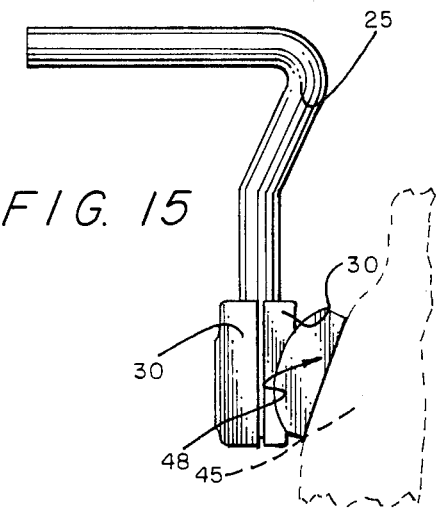
FIG. 15

MIRROR AND BRACKET ASSEMBLY

BACKGROUND OF THE INVENTION

1. Field of the Invention

This invention is related to a rear view mirror. More specifically, this invention provides an improved mirror and bracket assembly wherein the mirrors will not become misaligned in the event that the mirror housing is dropped or jarred.

2. Description of the Prior Art

U.S. Pat. No. 3,642,245 by Wohnlich and U.S. Pat. No. 3,934,807 by Boutin, both disclose truck type side view mirrors. U.S. Pat. No. 3,599,926 by Takahashi discloses a break-away mirror bracket wherein a fragible plate is connected by means of a bolt to the vehicle body and which plate will break upon impact of the mirror with a solid object allowing the mirror to break-away from the body of the vehicle. U.S. Pat. No. 3,887,156 by Hugonnier discloses an outside rearview mirror for a vehicle wherein the bracket mount is constructed in such a way that if the mirror engages a solid object, it will be separated from the bracket mounted on the vehicle. U.S. Pat. No. 2,705,904 to Tagliaferri teaches a reaview mirror wherein the mirror is comprised of a pair of sections which may be adhesively secured by cement to a support. U.S. Pat. No. 4,277,141 by Kleiber discloses a mirror assembly comprised of a plurality of mirrors mounted to a core or support by means of an epoxy cement. U.S. Pat. No. 3,402,004 to Warhol illustrates a mirror having its support in the form of a molded plastic which when the assembly is formed causes the mirror surfaces to be secured to the plastic core. U.S. Pat. No. 3,918,799 by Kurz, Jr. et al relates to a light-weight-molded mirror assembly which reduces vibration to a minimum and prevents the expelling or breaking of the mirror element in extreme temperatures. None of the foregoing prior art teach or suggest the particular mirror assembly and method for making a mirror housing of this invention.

SUMMARY OF THE INVENTION

The present invention accomplishes its desired objects by providing a break-away rearview mirror comprising a mirror housing having a lower housing recess and an upper housing recess separated from the lower housing recess by a partition. At least one lower central support means is secured generally to the approximate center of the bottom of the lower housing recess and a plurality of lower peripheral support means is attached to the bottom of the lower housing recess and generally surrounds or circumscribes the lower central support means. At least one upper central support means is attached generally to the approximate center of the bottom of the upper housing recess, and a plurality of upper peripheral support means is secured to the bottom of the upper housing recess and generally surrounds or circumscribes the upper central support means. A first bonding means with a predetermined setting time is positioned on top of the upper and lower central support means. A second bonding means with a predetermined setting time that is longer than the predetermined setting of the first bonding means is positioned on top of the plurality of upper and lower peripheral support means whereby when the second bonding means sets, it sets into an elastic, rubbery solid. A flat mirror of unity magnification is disposed on the upper central support means and the plurality of upper peripheral support means, and is bonded thereto by the first and second bonding means after the same have solidified. A convex mirror optically pre-aligned is disposed on the lower central support means and the plurality of lower peripheral support means, and is bonded thereto by the first and second bonding means after the same have solidified. The second bonding means is adapted upon solidification to provide a cushion effect for the flat mirror and the convex mirror against the upper and lower peripheral support means, respectively, to prevent the mirrors from breaking or becoming misaligned in the event the mirror housing is dropped or jarred. A mirror bracket means is attached to the mirror housing. A molded synthetic resin bracket means comprising a generally hollow structure having a bracket recess for receiving therethrough the bracket means, and a pair of generally mating box-like members. Each box-like member includes a pair of end walls and a pair of side walls. An end wall of each pair of box-like members has a semi-cylindrical recess defining a portion of the bracket recess such that when the box-like members mate, the semi-cylindrical recess on each portion of the box-like members are aligned when the bracket recess is formed. A means is provided for attaching the mirror bracket means to the molded bracket means to hold the mirror housing in an upright position. A mounting bracket means is connected to the molded bracket means to mount the combined mirror housing-mirror bracket means-molded bracket means on an automobile, truck or the like. The mounting bracket means has a structural portion of the same being encased within the synthetic resin bracket means, and the combined mirror housing-mirror bracket means breaks-away from the molded synthetic resin bracket means upon impact.

It is therefore an object of this invention to provide an improved mirror housing and bracket assembly whose mirrors will not become misaligned in the event of vibrations or the like.

Still further objects of the invention reside in the provision of a method for manufacturing a mirror housing with the mirrors that will not become misaligned.

These, together with the various ancillary objects and features which will become apparent as the following description proceeds, are attained by this invention, preferred embodiments being shown in the accompanying drawings, by way of example only, wherein.

BRIEF DESCRIPTION OF THE DRAWINGS

FIG. 9 is a front elevational view of the mirror bracket connected to the molded bracket which includes an upper and lower bracket;

FIG. 10 is a side elevational view of the assembly of FIG. 9 connected to an automobile;

FIG. 11 is an enlarged, segmented perspective view of the molded bracket;

FIG. 12 is a front elevational view of another embodiment of the mirror bracket connected to the molded bracket which includes only the lower bracket;

FIG. 13 is a side elevational view of the assembly of FIG. 12 connected to an automobile;

FIG. 14 is a front elevational view of the mirror bracket connected only to a molded bracket;

FIG. 15 is a side elevational view of the assembly of FIG. 14 secured to an automobile;

DETAILED DESCRIPTION OF THE INVENTION

Figure 1:
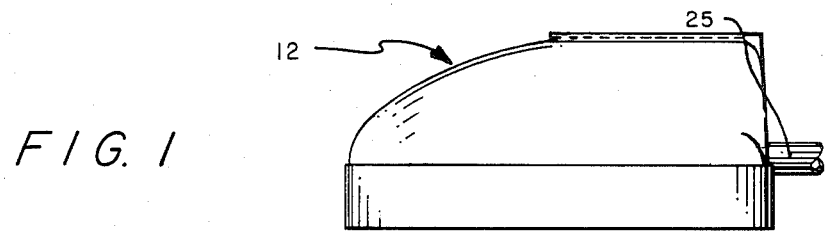
FIG. 1 is a top plan view of the mirror housing.

Referring in detail now to the drawings, wherein similar parts of the invention are identified by like reference numerals, there is seen a break-away mirror, generally illustrated as 10, having a mirror housing, generally illustrated as 12. Mirror housing 12 has a lower housing recess 14 and an upper housing recess 16 separated from the lower housing recess 14 by a partition 17. A lower post 18 is attached to the bottom of the lower housing recess 14 at approximately the center thereof, and an upper post 20 is connected to the bottom of the upper housing recess 16 likewise at about the center thereof. A plurality of lower peripheral posts 22 and a plurality of upper peripheral posts 24 respectively attach to the bottom of the lower housing recess 14 and the upper housing recess 16 such as to generally surround or circumscribe the lower post 18 and the upper post 20, respectively.

A mirror bracket 25 (preferably gooseneckcd or L-shaped) has one end secured to the mirror housing 12 through a housing trough, generally illustrated as 23 (see FIGS. 5 and 18), and another end attached to a molded syntethic resin bracket 26 (see FIG. 11) through a cylindrical bracket recess 28 which slidably receives the other end of the mirror bracket 25. Resin bracket 26 has a number of preferred embodiments.

Molded bracket 26 is preferably manufactured out of any of the synthetic resins (e.g. plastic polymers such as polyocetal, polyethylene, polypropylene, etc.) that would enable the mirror housing 12 and the attached mirror bracket 25 to break-away from the aperture 28 when impacted by a relatively, generally stationary object (e.g. a person or the like) to protect the object from damage by the mirror housing 12 and mirror bracket 22.

In a preferred embodiment of the invention, molded bracket 26 in FIGS. 9, 10 and 11, comprises a pair 30—30 of generally rectangular mating box-like members, each including a pair 32—32 of end walls and a pair 34—34 of side walls. An end wall 32 of each pair 30—30 of mating box-like members includes a generally semi-cylindrical recess 36 defining a portion of the cylindrical aperture 28. When the pair 30—30 of box-like members mate to form the molded bracket 26, the semi-cylindrical recesses 36—36 are aligned to form the cylindrical aperture 28. Each side wall 34 of each pair 30—30 of box-like members include a pair 38—38 of semi-circular grooves (see FIG. 11) such that when the pair 30—30 of box-like members mate, the semi-circular grooves align to form two circular apertures on each side of the molded bracket means 26. A rectangular face 40 of each 30 box-like member has a structure defining a plurality of apertures 42 for receiving bolts 43 to interconnect the pair 30—30 of box-like members.

An upper bracket 44 passes through one circular aperture on each side of the molded bracket 26 (see FIGS. 9 and 10) and attaches to an automobile 45, or the like. A lower bracket 46 passes through the other circular aperture on each side of the molded bracket 26 and attaches to the automobile 45 or the like underneath the upper bracket 44.

In another preferred embodiment for synthetic resin bracket 26, box-like members 30-30 may each only have one semi-circular groove 38 to form a circular aperture to receive the lower bracket 46 (see FIGS. 12 and 13), or the box-like members 30-30 of the synthetic resin bracket 26 may have no circular apertures to receive neither the upper or lower bracket 44, 46, but only the bracket aperture 28 to receive an end of the mirror bracket 25 (see FIGS. 14 and 15). In the embodiment of the invention in FIGS. 12-15, the synthetic resin bracket 26 is mounted to a mounting bracket, generally illustrated as 48, which is attached to an automobile 45.

Figure 2:
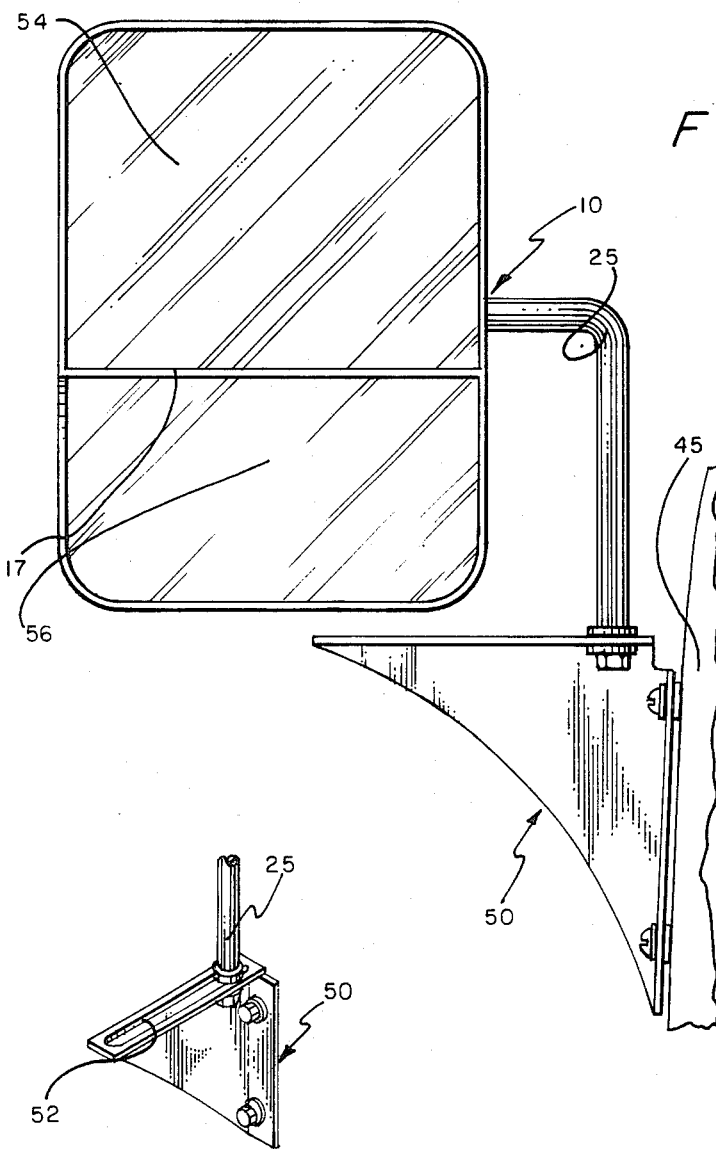
FIG. 2 is a front elevational view of the mirror housing connecting to a bracket plate through a mirror bracket.
Figure 3:
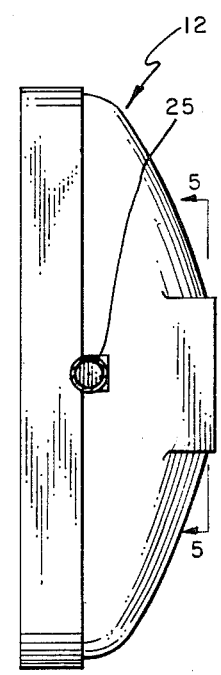
FIG. 3 is a side elevational view of the mirror housing.
Figure 4:
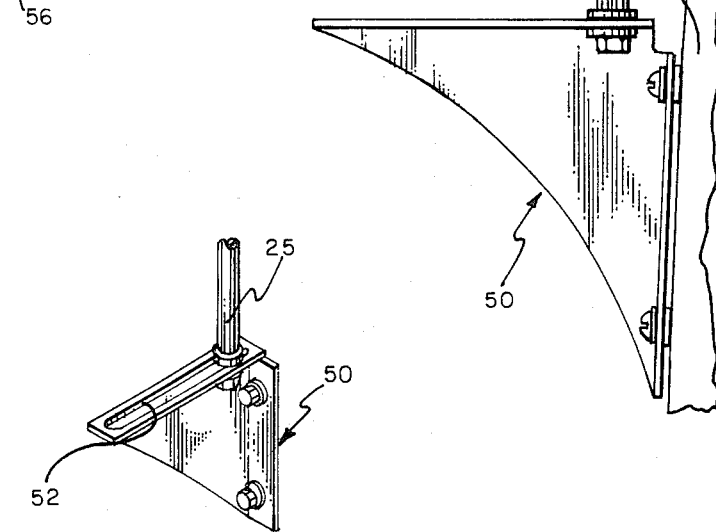
FIG. 4 is a partial perspective view of the slot of the mirror plate of FIG. 2 having an end of the mirror bracket slidably disposed within the slot.

For the embodiment of the invention represented in FIGS. 2 and 4, there is no synthetic resin bracket 26 but only a mounting plate, generally illustrated as 50, which is connected to an automobile 45. Mounting plate 50 has a structure defining a longitudinal slot 52 wherethrough an end of the mirror bracket 25 slidably passes to slidably lodge therein in order to adjust the distance the mirror housing 12 is away from the automobile.

A flat mirror 54 of unity magnification is disposed on and/or against the upper central post 20 and the plurality of upper peripheral posts 24, and a convex mirror 56 optically pre-aligned is disposed on and/or against the lower central post 18 and the plurality of lower peripheral posts 22. The flat mirror 54 and the convex mirror 56 are bonded to the upper central post 20 and the lower central post 18, respectively, with a bonding means means. Similarly, the flat mirror 54 and the convex mirror 56 are connected or bonded to the plurality of upper peripheral posts 24 and the lower peripheral posts 22 with another bonding means which has a setting time, or solidification time, which is longer than the setting or solidification time of the bonding means that secures the flat mirror 54 and the convex mirror 56 to the upper and lower central post 20 and 18, respectively.

The bonding means that connects the flat mirror 54 and the convex mirror 56 to the upper central post 20 and the lower central post 18, respectively, may be any type of quick setting cement which upon setting, forms a strong bond between the surface of the mirrors 54 and 56 and the respective upper and lower central posts 20 and 18. Preferably, such bonding means is a hot melt adhesive, which is 100% solids, solvent-free thermoplastic resin that becomes a fluid when heated; and in the molten state such hot melt adhesive wets the top of the upper and lower central posts 20 and 18, and the underneath surface of the flat mirror 54 and the convex mirror 56. Such hot melt adhesive upon cooling hardens without a chemical change to form a strong bond between the top of the upper and lower central posts 20 and 18 and the underneath surfaces of the flat mirror 54 and the convex mirror 56. Such suitable hot melt adhesives have been found to be the type sold under the registered trademark JET-melt Adhesive by the 3M Company, No. 3736, and sets up rapidly (typically less than 5 minutes) after being heated. The hot melt adhesives may be applied with any suitable applicator, such as an all-electric portable handgun sold under the trademark Polygun AE by the 3M Co.

The bonding means that is positioned on the top of the plurality of upper peripheral posts 24 and lower peripheral posts 22 to respectively bond or connect the flat mirror 54 and the convex mirror 56 thereto, has a longer setting time than the hot melt adhesive bonding agent, and is of the type that upon solidification or hardening provides a cushion effect, or a flexible, rubbery effect, for the flat mirror 54 and the convex mirror 56 against the upper and lower peripheral posts 24 and 22 respectively, to prevent the mirrors 54 and 56 from breaking or becoming misaligned in the event the mirror housing 12 is dropped or jarred. There are a number of such bonding means which could provide such an effect for the mirrors 54 and 56, such as, but not by way of limitation, the bonding plastic adhesive sold under the registered trademark SILASTIC by Dow Corning Company which is a R.T.V. plastic adhesive, self-priming high performance one-component product that cures typically in 24 hours into a durable, flexible silicon rubber upon exposure to water-vapor in the air.

Figure 19:
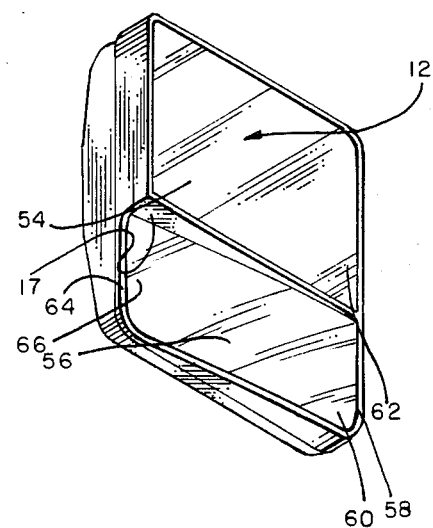
FIG. 19 is a perspective view of the mirror housing disclosing the flat mirror and the sloping convex mirror.

In a preferred embodiment of this invention, the convex mirror 56 does not entirely register with the planar surface of the flat mirror 54 (see FIGS. 15 and 19). Preferably, the convex mirror 56 at a end 58 of the lower housing recess 16 has an end 60 generally aligning with an edge 62 of the flat mirror 54 (see FIG. 19). The convex mirror 56 makes an arcuate convex path to another end 64 of the lower housing recess 16. The other end 64 of the lower housing recess 16 is opposed to the end 58 of the lower housing recess, such that an end 66 of the convex mirror 56 is situated at the end 64 of the lower housing 16 and slants away and downwardly from the end 60 of the convex mirror 56 (at the end 58 of the lower housing 16) and is disposed lower than the planar surface of the flat mirror 54 in order to provide a predetermined field of vision. Preferably, a chord plane of the convex mirror 56 forms an angle of between about 1 and 10 degrees with a plane of the flat mirror 54. Preferably, a chord plane of the convex mirror with the plane of the flat mirror 54. However, this can vary and be changed to meet requirements depending on the type of vehicle, body contour of the vehicle, driver position relative to mirror locations and eye-level from ground. The combination of the flat mirror 54 and the convex mirror 56 provide for increased areas of vision.

The housing trough 23 (see FIGS. 5 and 18) of this invention includes walls 68 and 70 that attach to the bottom of the upper housing recess 16, and a bottom 72 (see FIG. 5) that attaches to the walls 68 and 70. The bottom 72 has a structure defining a semi-cylindrical groove 74. The mirror housing 12 additionally has a housing aperture 76 within the side of the upper housing recess 16 (see FIG. 5). Wall 70 of the trough 23 also has an aperture 78 (see FIG. 18). The housing aperture 76 registers with the semi-cylindrical groove 74 such that the mirror bracket 25 may extend through the aperture 76 and into the semicylindrical groove 74, and if desired, further through the aperture 78 of the wall 70. A clamp 80 (see FIG. 8) having apertures 82 may be utilized to hold the end of the mirror bracket 25 within the semi-cylindrical groove 74 when superimposed thereover and secured with screws (not shown in the drawings) piercing the apertures 82 of the clamp 80. After the end of the bracket 25 is firmly secured within the semi-cylindrical groove 74, a cover 84 (see FIG. 6) may be utilized to cover or enclose the housing trough 23 at the back of the mirror housing (of FIG. 5).

Figure 20:
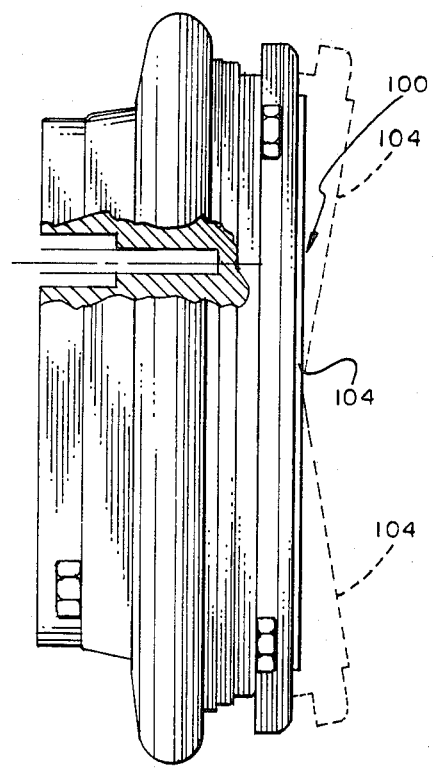
FIG. 20 is a side elevational view of a motor which is capable of adjusting horizontally and/or vertically the mirrors which are mounted to a backing that is secured to the face of the motor.
Figure 25:
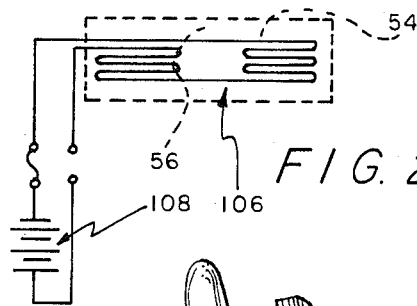
FIG. 25 is the electrical diagram for defoging the mirrors by heating electrically the mirrors.
Figure 21:
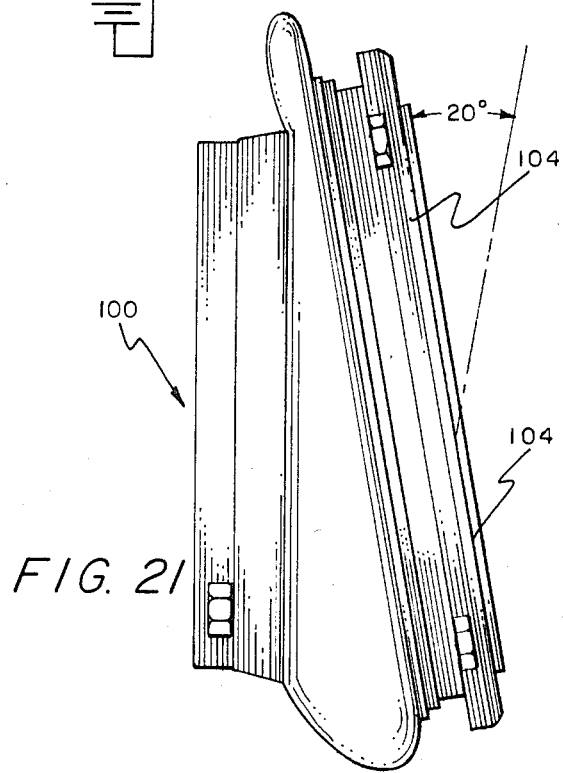
FIG. 21 is a side elevational view of the motor whose face is at a 20° angle with respect to a horizontal plane.
Figure 23:
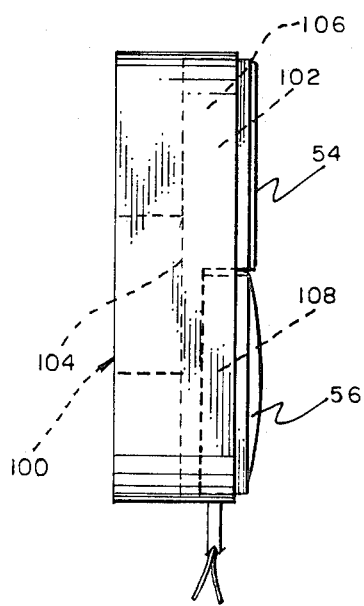
FIG. 23 is a side elevational view of the housing with the motor and backing represented as dotted lines.
Figure 22:
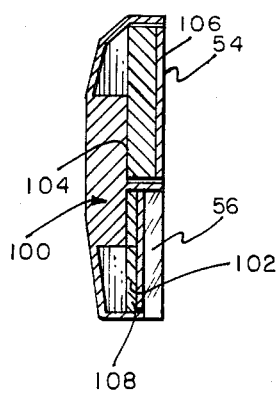
FIG. 22 is a vertical elevational view taken in direction of the arrow and along the plane of line 22—22 in FIG. 24 disclosing the housing without the plurality of posts and having the motor mounted in the housing and the backing that supports the flat and convex mirrors secured to the face of the motor.
Figure 24:
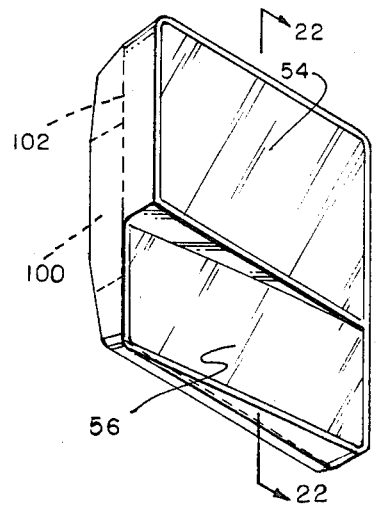
FIG. 24 is a perspective view of the housing and mirrors which are supported by the motor represented as dotted lines.

In the preferred embodiment of my invention in FIGS. 20–25, a motor, generally illustrated as 100 and disclosed in U.S. Pat. No. 4,281,898 (which will be incorporated herein by reference), is utilized to control remotely from within the truck, van, car, or the like, the horizontal and/or vertical adjustment as a unit of the prealigned flat mirror 54 and the convex mirror 56. The motor 100 has a face 104, and is secured to the back of the housing 12 which in this embodiment of the invention does not have any posts or recesses. The mirrors 54 and 56 are secured to a backing 102 by the bonding means that connects the flat mirror 54 and the convex mirror 56 to the plurality of posts. The backing 102 has a flat portion 106 and a triangular portion 108 which slopes and mirror 54 and 56 respectively rests upon the flat portion 106 and triangular portion 108. As illustrated in FIGS. 21, 23 and 24, the backing 102 is secured to the face 104 of the motor 100. The motor 100 is capable of adjusting in a given direction the face 104 of the motor 100 at a twenty (20) degree angle with respect to a horizontal plane, as illustrated in FIGS. 20 and 21. The mirrors 54 and 56 are prealigned and the motor 100 with its movable, adjustable face 104 enables a driver of a vehicle, car, van, truck, or the like, having the mirrors 54, 56 mounted thereto to be adjusted remotely in accordance with the desired viewing position of the driver. As illustrated in FIG. 25, electronic circuitry, generally illustrated as 106, is positioned on the back of the mirror 54 and/or mirror 56 to defog the mirrors 54 and/or 56. Power to the electrical circuit 108 is controlled by a battery 108, which is the battery for the van or truck.

With continuing reference to the drawings for operation of the invention and the method for producing a mirror housing 12 having a flat mirror 54 and a convex mirror 56 which will not break or become misaligned in the event the mirror housing 12 is dropped or jarred, the mirror housing 12 is formed or manufactured such as to have the lower housing recess 14 with at least one lower central post 18 secured to the bottom thereof, and a plurality lower peripheral support posts 22 attached also to the bottom of the lower housing recess 14 and generally surrounding or circumscribing the lower central post 18. The mirror housing 12 is also formed or manufactured with an upper housing recess 16 that is separated from the lower housing recess 14 by a partition 17. The upper housing recess 16 includes at least one central upper post 20 secured to the bottom thereof, and a plurality of upper peripheral posts 24 also secured to the bottom thereof in such a manner as to surround or cicumscribe the upper central post 20.

The mirror housing 12 may be constructed of any suitale material, preferably a plastic material. While polypropylene or polyethylene is preferred, many other types of plastics may be utilized, such as, by way of example only, ABS (acrylonitrile butadien-styrene), and certain polystyrenes may also be utilized.

The mirror housing 12 is also formed or manufactured with the housing trough 23 that has walls 68 and 70. The partition 17 forms another wall of the trough 23 whereas a portion of the side of the housing 12 forms yet another wall. Aperture 76 is formed on the side of the housing 12 and communicates with the inside of and lower central post 18 is to provide a quick setting cement that rapidly hardens in order to hold the flat mirror 54 and the convex mirror 56 into their respective desired position as the second bonding agent or Silastic R cures into the durable, flexible silicon rubber which takes a longer period of time to cure than the hot melt adhesive, because curing of the Silastic R bonding agent depends upon exposure to water-vapor in the air. I have discovered that the hot melt adhesive is not operable to hold the flat mirror 54 and the convex mirror 56 to their respective support posts while simultaneously offering a cushion-like-elastic-rubbery effect between the flat mirror 54 and the convex mirror 56 and their respective support posts. The hot melt adhesive would be operable as a securing agent but not operable as the agent to offer the flexible, elastic, cushion-like, rubbery effect which would prevent the mirrors 54 and 56 from breaking when the mirror housing 12 is dropped or jarred.

After a predetermined amount of time (i.e. less than 5 minutes) the hot melt adhesive solidifies. After another predetermined amount of time (usually one to two days) the second bonding agent or (Silastic R) cures or sets up to further hold or secure the flat mirror 54 and convex mirror 56 in their respective desired positions while simultaneously offering or providing a rubber, elastic, cushion-like support for both mirrors 54 and 56 on their respective peripheral support posts 24 and 22. Thus, if the mirror housing 12 is dropped or jarred, the mirrors 54 and 56 will not become misaligned.

Figure 5:
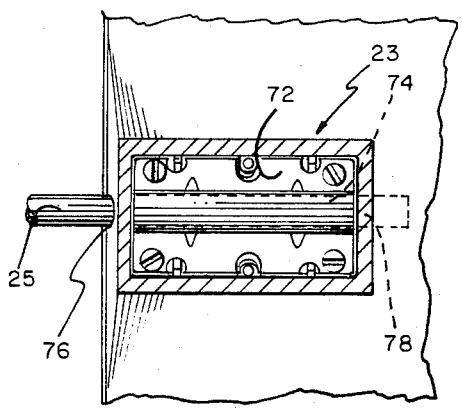
FIG. 5 is a horizontal sectional view of the mirror housing disclosing the housing trough taken in direction of the arrows and along the plane of line 5—5 in FIG. 3.
Figure 6:
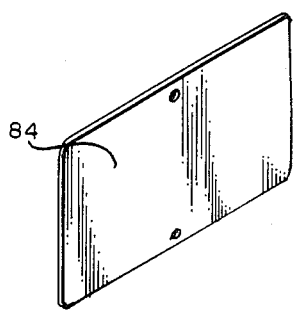
FIG. 6 is a perspective view of the cover which covers the housing trough.
Figure 7:
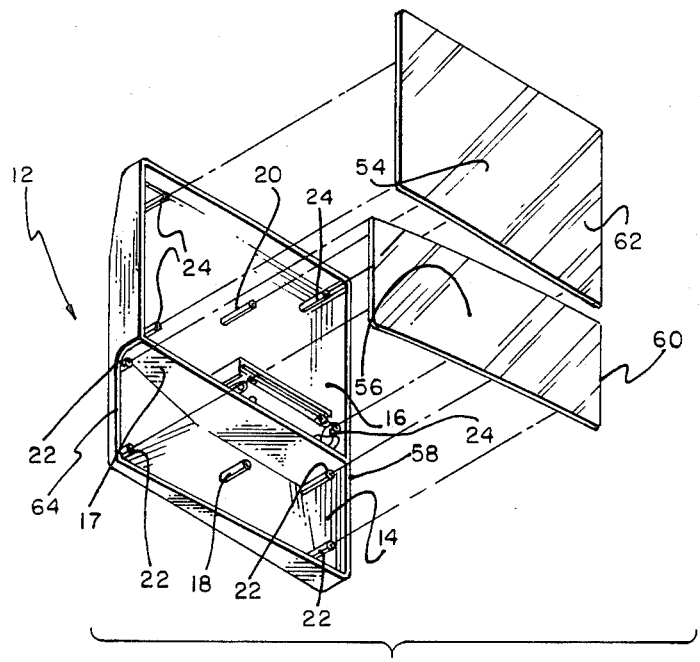
FIG. 7 is a partial perspective view of the mirror housing disclosing the disassembled flat mirror and a convex mirror.
Figure 8:
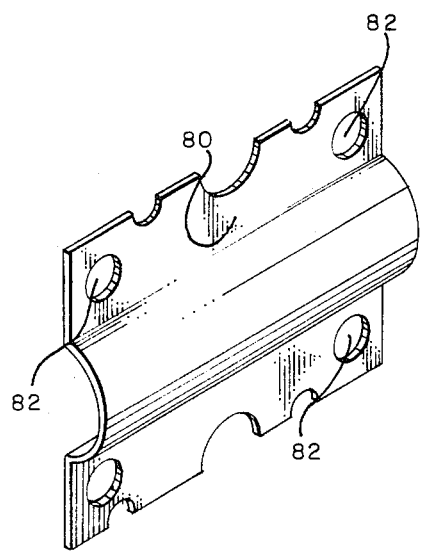
FIG. 8 is a perspective view of the clamp for the bottom of the trough to hold the end of the mirror bracket in place.
Figure 16:
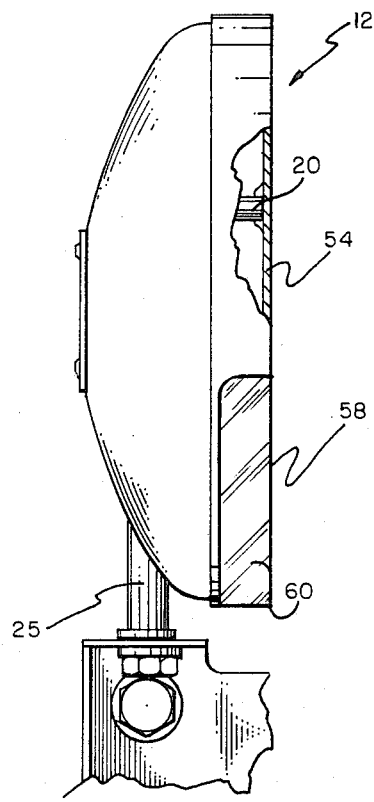
FIG. 16 is an end elevational view of the mirror housing disclosing the flat mirror and the sloping convex mirror.
Figure 17:
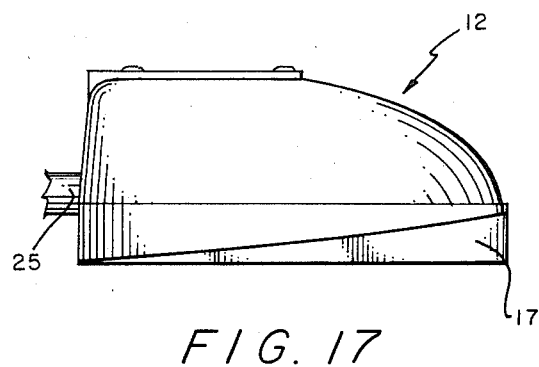
FIG. 17 is a bottom elevational view of the mirror housing disclosing the sloping convex mirror.
Figure 18:
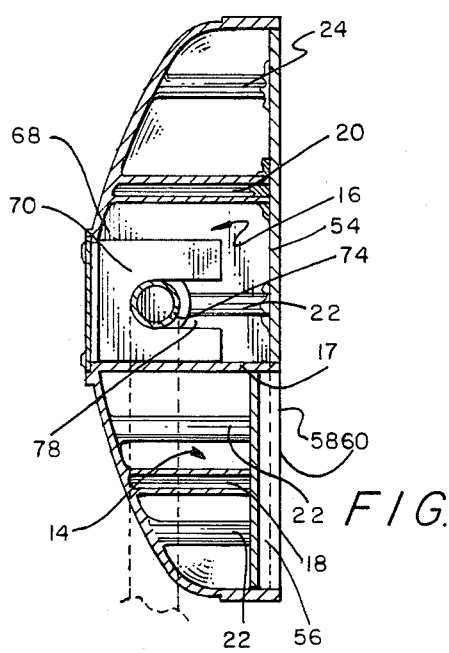
FIG. 18 is a vertical sectional view of the mirror housing disclosing an end of the housing trough.

After the mirror housing 12 has been formed or manufactured in accordance with the foregoing, the mirror bracket 25 has one of its ends positioned through the aperture 76 and into the semicylindrical groove 74, and further through aperture 78 (as illustrated in FIGS. 5 and 18). The clamp 80 of FIG. 8 is secured over the end of the mirror bracket 25 to steadfastly secure the same within the semi-cylindrical groove 74. Subsequently, the cover 84 of FIG. 6 is positioned over the housing trough 23 in order to cover the housing trough 23 at the back of the housing 12 (see FIG. 5). The mirror bracket 25 and the housing frame 12 attached thereto, may be subsequently lodged within the bracket aperture 28 of the molded bracket 26 (see FIGS. 11, 12, 13, 14 and 15). In the event that the embodiment of the molded bracket 26 of FIGS. 9–10 is utilized, the upper bracket 44 is passed through one of the circular apertures to connect the molded bracket 26 to the automobile 45. If the preferred embodiment of the invention of FIGS. 9–13 is being used, a lower bracket 46 is also used to secure the molded bracket 26 to the automobile 45. In the event that neither the upper bracket 44 or lower bracket 46 is utilized, then the mounting bracket 48 connects the molded bracket 26 to the automobile 45, as illustrated in FIGS. 14 and 15.

When a generally stationary object or person is contacted by the combined mirror housing 12-bracket 25 as the automobile 45 is being driven, the combined mirror housing 12-bracket 25 breaks the molded bracket 26 at the bracket aperture 28 to dislodge the combined mirror housing 12-bracket 25 from within the molded bracket 26 to protect the person or object from serious injury. When the combined mirror housing 12-bracket 25 hits the ground, the mirrors 54 and 56 do not become misaligned due to the cushion-like rubbery effect that the bonding agent provides on the peripheral support posts 22 and 24. Similarly, the mirrors 54 and 56 do not become misaligned from the automobile 45 hitting bumps, or the like, because of the effects of the same binding agent.

The embodiment of the invention of FIGS. 2 and 4 may offer the break-away feature of this invention if the mounting plate 50 is constructed of the appropriate material, such as any of the plastic resins that the molded bracket is manufactured from. Otherwise, the embodiment of this invention of FIGS. 2 and 4 would not offer the break-away feature, but would offer the feature that the flat mirror 54 and the convex mirror 56 would not become misaligned or out of position from the bumps of the highway or any fender-bender accident.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A break-away rearview mirror comprising a mirror housing having a lower housing recess and an upper housing recess separated from said lower housing recess by a partition; at least one lower central support means secured generally to the approximate center of the bottom of said lower housing recess and a plurality of lower peripheral support means attached to the bottom of said lower housing recess and generally circumscribing said lower central support means; at least one upper central support means attached generally to the approximate center of the bottom of said upper housing recess and a plurality of upper peripheral support means secured to the bottom of said upper housing recess and generally circumscribing said upper central support means; a first bonding means with a predetermined setting time positioned on top of said upper and lower central support means; a second bonding means with a predetermined setting time that is longer than said predetermined setting time of said first bonding means and positioned on top of said plurality of upper and lower peripheral support means whereby when said second bonding means sets, it sets into an elastic, rubbery solid; a flat mirror of unity magnification disposed on said upper central support means and said plurality of upper peripheral support means, and bonded thereto by said first and second bonding means after the same have solidified; a convex mirror optically pre-aligned disposed on said lower central support means and said plurality of lower peripheral support means and bonded thereto by said first and second bonding means after the same have solidified; said second bonding means adapted upon solidification to provide a cushion effect for the flat mirror and the convex mirror against the upper and lower peripheral support means, respectively, to prevent the mirrors from breaking or becoming misaligned in the event the mirror housing is dropped or jarred; a mirror bracket means attached to said mirror housing; a molded synthetic resin bracket means comprising a generally hollow structure having a bracket recess for receiving therethrough said bracket means and a pair of generally rectangular mating box-like members, each including a pair of end walls and a pair of side walls, an end wall of each pair of boxlike members including a semi-cylindrical recess defining a portion of said bracket recess such that when said box-like members mate, the semi-cylindrical recess on each portion of said box-like members are aligned when the bracket recess is formed; a means for attaching said mirror bracket means to said molded bracket means to hold said mirror housing in an upright positon; and a mounting bracket means connecting to said molded bracket means to mount said combined mirror housing-mirror bracket means-molded bracket means on an automobile and, said mounting bracket means having a structural portion of same being encased within said synthetic resin bracket means, said combined mirror housing-mirror bracket means breaking-away from said molded synthetic resin bracket means upon impact.

2. A break-away rearview mirror comprising a mirror housing having a lower housing recess and an upper housing recess separated from said lower housing recess by a partition; at least one lower central support means secured generally to the approximate center of the bottom of said lower housing recess and a plurality of lower peripheral support means attached to the bottom of said lower housing recess and generally circumscribing said lower central support means; at least one upper central support means attached generally to the approximate center of the bottom of said upper housing recess and a plurality of upper peripheral support means secured to the bottom of said upper housing recess and generally circumscribing said upper central support means; a first bonding means with a predetermined setting time positioned on top of said upper and lower central support means; a second bonding means with a predetermined setting time that is longer than said predetermined setting time of said first bonding means and positioned on top of said plurality of upper and lower peripheral support means whereby when said second bonding means sets, it sets into an elastic, rubbery solid; a flat mirror of unity magnification disposed on said upper central support means and said plurality of upper peripheral support means, and bonded thereto by said first and second bonding means after the same have solidified; a convex mirror optically pre-aligned disposed on said lower central support means and said plurality of lower peripheral support means and bonded thereto by said first and second bonding means after the same have solidified; said second bonding means adapted upon solidification to provide a cushion effect for the flat mirror and the convex mirror against the upper and lower peripheral support means, respectively, to prevent the mirror from breaking or becoming misaligned in the event the mirror housing is dropped or jarred; a mirror bracket means attached to said mirror housing; and a mounting plate means to be mounted on an automobile, and has a structure defining a slot wherethrough said mirror bracket means slidably lodges in order to adjust the distance said mirror housing is away from said automobile.

3. A break away rearview mirror comprising a mirror housing having a lower housing recess and an upper housing recess separted from said lower housing recess by a partition; at least one lower central support means secured generally to the approximate center of the bottom of said lower housing recess and a plurality of lower peripheral support means attached to the bottom of said lower housing recess and generally circumscribing said lower central support means; at least one upper central support means attached generally to the approximate center of the bottom of said upper housing recess and a plurality of upper peripheral support means secured to the bottom of said upper housing recess and generally circumscribing said upper central support means; a first bonding means with a predetermined setting time positioned on top of said upper and lower central support means; a second bonding means with a predetermined setting time that is longer than said predetermined setting time of said first bonding means and positioned on top of said plurality of upper and lower peripheral support means whereby when said second bonding means sets, it sets into an elastic, rubbery solid; a flat mirror of unity magnification disposed on said upper central support means and said plurality of upper peripheral support means, and bonded thereto by said first and second bonding means after the same have solidified; a convex mirror optically pre-aligned disposed on said lower central support means and said plurality of lower peripheral support means and bonded thereto by said first and second bonding means after the same have solioified; said second bonding means adapted upon solidification to provide a cushion effect for the flat mirror and the convex mirror against the upper and lower peripheral support means, respectively, to prevent the mirror from breaking or becoming misaligned in the event the mirror housing is dropped or jarred; a mirror bracket means attached to said mirror housing; and a molded synthetic resin bracket means comprising a bracket recess wherethrough said mirror bracket means rotatably, slidably lodges and a pair of generally rectangular mating box-like members, each including a generally semi-cylindrical recess defining a portion of said bracket recess such that when said box-like members mate, said bracket recess is formed; and a mounting bracket means connecting to said molded bracket means to mount said combined mirror housing-molded bracket means on an automobile.

4. The break-away mirror of claim 1, 2 or 3 wherein said convex mirror at a first end or said lower housing recess has an end generally aligning with an edge of the flat mirror, and said convex mirror makes an arcuate convex path to a second end of said lower housing recess which is opposed to said first end such that an end of the convex mirror situated at the second end of said lower housing recess slants away and downwardly from the end of the convex mirror at the first end of said lower housing recess and is disposed lower than the planar surface of the flat mirror in order to provide a predetermined field of vision.

5. The break-away mirror of claim 1 wherein the side walls of at least one of said pair of box-like members include a structure defining at least one semi-circular groove, said mounting bracket means lodging within said semi circular grooves.

6. The break-away mirror of claim 1 wherein the side walls of each of said pair of box-like members include a structure defining at least one semi-circular groove such that when said box-like members mate, the semi-circular grooves align to form a circular aperture on each side of said molded bracket means wherethrough a structural portion of said mounting bracket means passes.

7. The break-away mirror of claim 1 wherein each side wall of said pair of box-like members include a structure defining two semi-circular grooves such that when said box like members mate, the semi-circular grooves align to form two circular apertures on each side of said molded bracket means.

8. The break-away mirror of claim 7 wherein said mounting bracket means comprises an upper bracket and a lower bracket, said upper bracket passing through one circular aperture on each side of said molded bracket means and attached to said automobile, said lower bracket passing through the other circular aperture on each side of said molded bracket means and attaching to the automobile, truck, or the like, underneath said upper bracket.

9. The break-away mirror of claim 4 wherein said mirror is positioned contiguous to the end of said flat mirror, said convex mirror having a chord plane forming an angle of between about 1 degree and 10 degrees with the plane of the flat mirror.

10. The break-away mirror of claim 2 wherein said convex mirror at a first end of said lower housing recess has an end generally aligning with an edge of the flat mirror, and said convex mirror makes an arcuate convex path to a second end of said lower housing recess which is opposed to said first end such that the end of the convex mirror situated at the second end of said lower housing recess slants away and downwardly from the end of the convex mirror at the first end of said lower housing recess and is disposed lower than the planar surface of the flat mirror in order to provide a predetermined field of vision.

11. The break-away mirror of claim 3 wherein said convex mirror at a first end of said lower housing recess has an end generally aligning with an edge of the flat mirror, and said convex mirror makes an arcuate convex path to a second end of said lower housing recess which is opposed to said first end such that the end of the convex mirror situated at the second end of said lower housing recess slants away and downwardly from the end of the convex mirror at the first end of said lower housing recess and is disposed lower than the planar surface of the flat mirror in order to provide a predetermined field of vision.

12. The break-away mirror of claim 3 wherein the side walls of each of said pair of box-like members include a structure defining at least one semi-circular groove such that when said box-like members mate, the semi-circular grooves align to form a circular aperture on each side of said molded bracket means wherethrough a structural portion of said mounting bracket means passes.

13. The break-away mirror of claim 8 wherein said mirror is positioned contiguous to the end of said flat mirror, said convex mirror having a chord plane forming an angle of between about 1 degree and 10 degrees with the plane of the flat mirror.

* * * * *